(No Model.)

B. A. DOBSON.
APPARATUS FOR TESTING THE ACCURACY OF THE ADJUSTMENT OF A ROTATING SHAFT.

No. 402,726. Patented May 7, 1889.

WITNESSES:
Donn Twitchell.
E. M. Clark.

INVENTOR:
B. A. Dobson
BY
ATTORNEYS.

UNITED STATES PATENT OFFICE.

BENJAMIN ALFRED DOBSON, OF BOLTON, COUNTY OF LANCASTER, ENGLAND.

APPARATUS FOR TESTING THE ACCURACY OF THE ADJUSTMENT OF A ROTATING SHAFT.

SPECIFICATION forming part of Letters Patent No. 402,726, dated May 7, 1889.

Application filed December 4, 1888. Serial No. 292,686. (No model.) Patented in England March 10, 1888, No. 3,699.

*To all whom it may concern:*

Be it known that I, BENJAMIN ALFRED DOBSON, a subject of the Queen of Great Britain, and a resident of Bolton, in the county of Lancaster, England, have invented a certain new and useful Improvement in Apparatus for Testing the Accuracy of the Adjustment of a Rotating Shaft, (for which I have obtained Letters Patent in Great Britain, No. 3,699, dated March 10, 1888,) of which the following is a specification.

The cylinders of carding-engines require to be adjusted to compensate for wear. In a patent, No. 395,428, dated January 1, 1889, I have shown an improved means for effecting such adjustment.

The present invention has for its object to enable the accuracy of the adjustment and the concentricity or true working position of the main cylinder and its shaft to be readily tested and determined, whatever may be the particular means employed for making the adjustment.

I will proceed to describe the construction and operation of parts embodying my invention by reference to accompanying drawings, in which—

Figure 1:
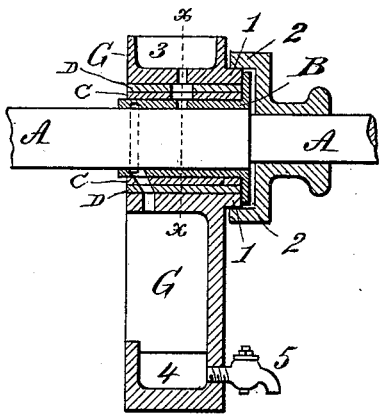
Figure 3:
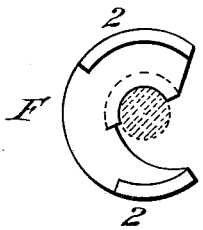
Figure 4:
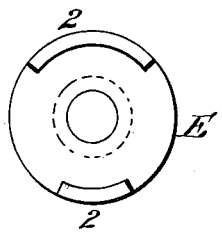
Figure 2:
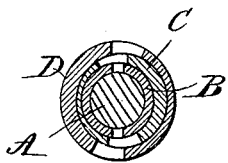

Figure 1 is a vertical section showing a shaft journaled in a bearing, (such as described in my aforesaid patent,) together with my improved means for testing the adjustment of the shaft. Fig. 2 is a vertical section on line *x x*, Fig. 1. Figs. 3 and 4 are face views of two different forms of shaft-collars, either of which may constitute part of the means for testing the position of the shaft.

The letter A, Fig. 1, indicates a portion of a rotatable shaft—say the shaft of a carding-cylinder. It is encircled by and rotates in a bushing, B, which is supported in and may be adjusted (to compensate for wear) by two eccentric-sleeves, C D. I deem it unnecessary to show or describe my preferred means (or any other) for turning these sleeves C D on the common axis in order to effect such adjustment of the shaft A as may be required at any time. It suffices to state that, however and whenever the adjustment is made, it is desirable or necessary to determine if it is correct—that is to say, if the shaft has been adjusted to its original true position—and it is then that my present invention is applicable.

The means I employ are a fixed flange, 1, Fig. 1, on the pedestal or shaft-support G, and one of the flanged collars E F. (Shown in Figs. 3 and 4.) The said flange 1 is cast on or permanently attached to the face of said pedestal, surrounding and thus permanently concentric with the hole in the latter through which the shaft A passes, and thereby with the shaft itself as originally set.

The circular disk-like collar E (shown in Fig. 4) has a central opening just large enough to receive the shaft A, and is provided with a concentric top and bottom flange, 2, formed on one of its faces. These flanges might be extended to form a complete circle; but it is unnecessary. In any case they must be parts of a circle greater in diameter than the circle of which the aforesaid flange 1 on the pedestal G is a part. In practical use of this collar E the driving-pulley (not shown) of the shaft A is removed and the collar E placed on the shaft and adjusted, as shown in Fig. 1, so that its flanges 2 embrace or project over and fit on the fixed flange 1 on the pedestal G. When the collar E is in this position, it is determined beyond doubt that the shaft A has been restored to its original setting.

The collar shown in Fig. 3 is adapted for use on the shaft A without necessitating removal of the driving-pulley. To this end the collar is cut out on one side sufficiently to admit the shaft into the central opening, as indicated by dotted lines. Thus the collar F may be quickly placed on and removed from the shaft and enables the desired test to be made with the utmost rapidity.

Incidentally I show in Fig. 1 a construction for insuring thorough lubrication of the shaft A—that is to say, I construct the shaft-support or pedestal G with an oil-cup, 3, at the top, and provide said cup with an exit-opening which coincides with holes or slots in the two eccentrics C D and bushing B, so as to form a passage in the upper side of the shaft, and I make a second series of slots, so as to form a similar passage on the under side of the shaft. The lubricant flows down the passages and escapes into a reservoir, 4, formed in the foot of the pedestal G, whence it may be drawn from time to time by means of a faucet or tap, 5.

What I claim is—

1. The combination, with shaft-support having the fixed flange 1 concentric with the shaft-opening therein, and the eccentric adjustable sleeves C D, of the collar having a central shaft-opening and concentric flanges 2 on its face, which are adapted to embrace the flange 1 on said support, as and for the purpose specified.

2. The combination, with the shaft-support having a flange, 1, concentric with the opening therein, of the collar F, which is cut away on one side, as shown, and has face flanges 2, adapted to embrace the said flange on the shaft-support, as specified.

3. The collar F, having the flanges 2 and a central circular opening adapted to receive the shaft and cut away on one side, as and for the purpose specified.

In testimony that I claim the foregoing as my invention I have signed my name in presence of two witnesses.

BENJAMIN ALFRED DOBSON.

Witnesses:
 JOHN WILSON BURROWS,
  Clerk, "Clevelands," Heaton.
 PERCY EDWARD HASLAM,
  Clerk, 200 Blackburn Road, Bolton.